(12) United States Patent
Cohen et al.

(10) Patent No.: US 11,838,104 B2
(45) Date of Patent: Dec. 5, 2023

(54) WAVELENGTH MULTIPLEXING PROCESSOR

(71) Applicant: Cognifiber Ltd., Rosh Ha'Ayin (IL)

(72) Inventors: Eyal Cohen, Gedera (IL); Zeev Zalevsky, Rosh Ha'Ayin (IL)

(73) Assignee: COGNIFIBER LTD., Rosh Ha'ayin (IL)

(*) Notice: Subject to any disclaimer, the term of this patent is extended or adjusted under 35 U.S.C. 154(b) by 0 days.

(21) Appl. No.: 17/692,639

(22) Filed: Mar. 11, 2022

(65) Prior Publication Data

US 2022/0303040 A1 Sep. 22, 2022

Related U.S. Application Data

(60) Provisional application No. 63/161,694, filed on Mar. 16, 2021.

(51) Int. Cl.
*H04J 14/02* (2006.01)
*G02B 6/293* (2006.01)
*H04J 14/00* (2006.01)

(52) U.S. Cl.
CPC ........ *H04J 14/0256* (2013.01); *G02B 6/2938* (2013.01); *H04J 14/005* (2013.01)

(58) Field of Classification Search
None
See application file for complete search history.

(56) References Cited

U.S. PATENT DOCUMENTS

| 2002/0172458 A1* | 11/2002 | Downie | H04B 10/572 385/27 |
| 2011/0188855 A1* | 8/2011 | Kokubun | G02B 6/02042 398/43 |

(Continued)

FOREIGN PATENT DOCUMENTS

JP 2015135497 A 7/2015

OTHER PUBLICATIONS

Kokou Firmin Fiaboe, "Photonic crystal fibers with flattened zero dispersion for supercontinuum generation" Advanced Electromagnetics, vol. 8, No. 4, Sep. 2019.

(Continued)

*Primary Examiner* — Darren E Wolf
(74) *Attorney, Agent, or Firm* — CANTOR COLBURN LLP

(57) ABSTRACT

A wavelength multiplexing system is presented comprising at least one basic functional unit extending between input and output light ports. The basic functional unit comprises at least one multi-core fiber. The multi-core fiber comprises N cores configured for supporting transmission of N wavelength channels $\lambda_1, \ldots, \lambda_n$, wherein each of said at least one multi-core fibers is configured to apply a predetermined encoding pattern to the wavelength channels enabling linear mixing between them while propagating through multiple cores of said multi-core fiber. The encoding pattern may be configured to affect light propagation paths in the cores by inducing a predetermined dispersion pattern causing linear interaction and mixing between the channels; or may be configured to affect spectral encoding of the channels being transmitted through the cores by applying different weights to the channels.

19 Claims, 2 Drawing Sheets

(56) References Cited

U.S. PATENT DOCUMENTS

2011/0274438 A1* 11/2011 Fiorentino .............. G02B 6/34
                                                    398/187
2017/0302396 A1* 10/2017 Tait ..................... H04J 14/0204
2020/0174181 A1*  6/2020 Shahmoon ............ A61B 1/042

OTHER PUBLICATIONS

Partha Sona Maji, "Supercontinuum generation in ultra-flat near zero dispersion PCF with selective liquid infiltration", Optik 125 (2014) 5986-5992.
Pranaw Kumar, "Design of nonlinear photonic crystal fibers with ultra-flattened zero dispersion for supercontinuum generation", ETRI Journal. 2020;42(2):282-291.
Gal Shabtay, "Tunable birefringent filters—optimal iterative design", Dec. 30, 2002 / vol. 10, No. 26 / Optics Express 1534.
European Search Report for corresponding application EP22162065; Report dated Aug. 19, 2022.

* cited by examiner

WAVELENGTH MULTIPLEXING PROCESSOR

TECHNOLOGICAL FIELD AND BACKGROUND

The present invention is generally in the field of wavelength division multiplexing (WDM) techniques, and relates to an optical wavelength multiplexing processor.

In an optical network, optical signals may be transmitted at various wavelengths, where each wavelength corresponds to a transmission channel (data channel). An optical route may use a series of network nodes and optical links to connect a source of an optical transmission with a destination for the optical transmission (optical receiver).

As demand for optical network capacity grows, more than one transmission path (fiber, core, or transmission mode) is needed to transmit different optical signals (different data channels) between two optical nodes. Space-division multiplexing (SDM) may be used for parallel optical transmission of multiple channels using multiple fiber cores of a multi-core fiber, because the multiple cores of a multi-core fiber define multiple spatially physically distinct data paths/channels through a single fiber.

Wavelength division multiplexing (WDM) is used in fiber-optic communications to multiplex a plurality of optical carrier signals (channels), each with a unique wavelength, onto a single-core optical fiber to be sent simultaneously over the same optical fiber core. A WDM system typically uses a multiplexer at the transmitter part to mix several signals together and a demultiplexer at the receiver part to split them.

GENERAL DESCRIPTION

The present invention provides a novel approach for multiplexing multiple data channels and transmitting them together via a multi-core fiber, while maintaining the quality of data channels being transmitted and allowing demultiplexing at the receiver side.

According to one broad aspect of the invention, it provides a wavelength multiplexing system comprising at least one basic functional unit extending between input and output light ports, the basic functional unit comprising at least one multi-core fiber, the multi-core fiber comprising N cores configured for supporting transmission of N wavelength channels $\lambda_1, \ldots, \lambda_n$, wherein each of said at least one multi-core fibers is configured to apply a predetermined encoding pattern to the wavelength channels enabling linear mixing between them while propagating through multiple cores of said multi-core fiber.

The predetermined encoding pattern is defined by N non-linear processings applied to the N channels, respectively.

Thus, according to the invention, the multi-core fiber unit (including one or more multi-core fibers), extending between input and output signal ports, is configured as a multi-dimensional wavelength multiplexing processor, which is adapted to encode different channels being transmitted through the multiple cores of multi-core fiber(s) in a predetermined manner.

In some embodiments of the invention, such encoding is implemented via affecting light propagation paths (cores) by inducing a predetermined dispersion pattern causing linear interaction and mixing between the channels.

More specifically, the multiple cores of the multi-core fiber unit are configured as supercontinuum generators, i.e., include non-linear media causing spectral broadening of WDM channels (due to the super continuum non-linearity) around their respective central wavelengths, according to an ITU grid that is to be mixed.

For example, the fiber cores may include or may be configured as photonic crystal fibers (PCFs), which are configured such that each has substantially zero dispersion for the central wavelength of the respective channel which is to be transmitted via said core. By this, the wavelengths of the broadened spectra of different channels can linearly interact with one another via non-linear effect. Demultiplexing of the channels can be implemented by using an arrayed waveguide grating (AWG) at the output of the super continuum multi-core fiber unit.

In some other embodiments, spectral encoding of different channels being transmitted through the multiple cores of multi-core fiber(s) is performed. This may be implemented by using multiple tunable spectral filters in association with the multiple fiber cores, respectively, to apply different weights to the WDM channels.

Such filters may be configured as birefringent filters utilizing phase shifts between orthogonal polarizations of light to obtain narrow band filters. Such tunable spectral filters may be configured for example as Solc filters or filters described in the following article: G. Shabtay, E. Eidinger, Z. Zalevsky, D. Mendlovic and E. Marom, "*Tunable birefringent filters—optimal iterative design*", Opt. Express 10 1534-1541 (2002).

Using such filters in association with different channels applies different weight functions for side lobes attenuation. Keeping in mind that a detector (at the receiver part) is not wavelength sensitive, all the spectral information is added there together resulting in weighted mixing of the channels. Thus, in these embodiments, the system configuration might be simpler just using a transponder (transmitter for transmitting the data channel and receiver for collecting it and closing an AI loop).

According to another broad aspect of the invention, there is provided an optical fiber unit configured and operable for use in a wavelength multiplexing system between input and output ports of the system, the optical fiber unit comprising at least one multi-core fiber, the multi-core fiber comprising N cores configured for supporting transmission of N wavelength channels $\lambda_1, \ldots, \lambda_n$, wherein each of said at least one multi-core fibers is configured to apply a predetermined encoding pattern to the wavelength channels enabling linear mixing between them while propagating through multiple cores of said multi-core fiber, said predetermined encoding pattern being characterized by one of the following: affecting light propagation paths in the cores by inducing a predetermined dispersion pattern causing linear interaction and mixing between the channels; and affecting spectral encoding of the channels being transmitted through the cores by applying different weights to the channels.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which.

DETAILED DESCRIPTION OF EMBODIMENTS

Figure 1:
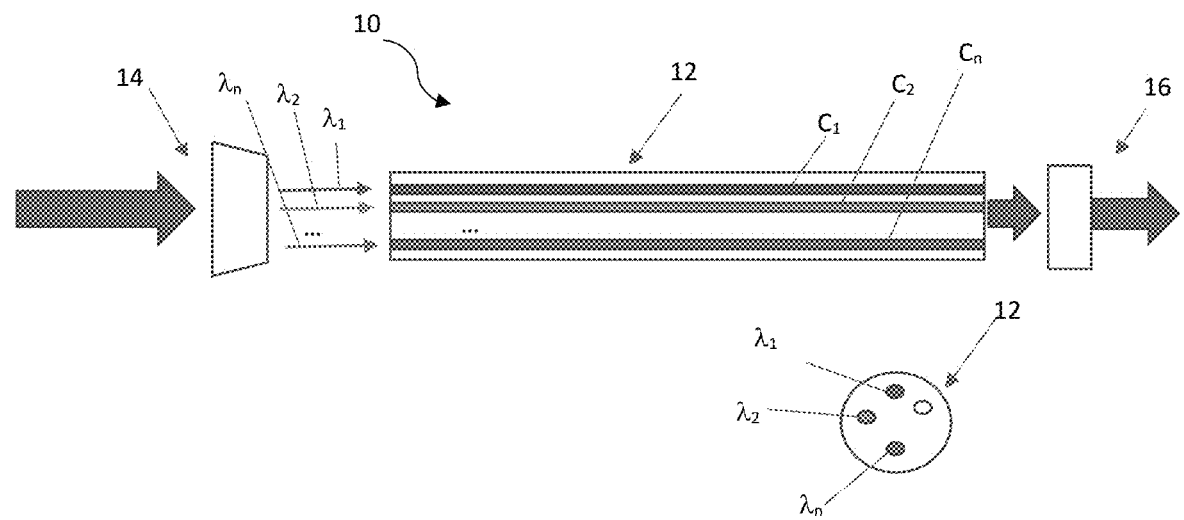
FIG. 1 schematically exemplifies a multi-dimensional WDM system utilizing multicore fiber unit(s) each configured as a multiplexer, according to some embodiments of the invention.

Referring to FIG. 1, there is schematically illustrated a device 10 which is configured to be used as a basic functional unit of a WDM system according to some embodiments of the invention. The device 10 includes at least one multi-core fiber unit 12. The fiber unit includes a number M (M≥1) of multi-core fibers. The multi-core fiber unit(s) 12 extend(s) between input and output ports 14 and 16 of the WDM system.

In the present non-limiting example of FIG. 1, the multi-core fiber unit 12 is exemplified as including a single multi-core fiber (M=1), extending between the input and output ports 14 and 16. However, it should be understood that the principles of the invention are not limited to the number of fiber units, as well as to the number of multi-core fibers in each fiber units and the number of multiple cores of the fiber.

Also, it should be noted that the multi-core fibers units forming the WDM system may or may not be identical in the number of fibers or number of cores.

The multi-core fiber 12 has a plurality/array of N cores $C_1, \ldots C_n$, supporting N different wavelengths $\lambda_1, \ldots, \lambda_n$, and is configured and operable as a multi-dimensional wavelength multiplexing processor for processing respective N input data channels (light signals) of wavelengths $\lambda_1, \ldots, \lambda_n$, by encoding the light signals via a non-linear effect, to enable linear interaction and mixing between the channels.

The above can be achieved by configuring each i-th fiber core $C_i$, as a supercontinuum generator broadening the light signal around its respective central wavelength $\lambda_1$. For example, this can be implemented by configuring the fiber core as a photonic crystal fiber (PCF) having substantially zero dispersion for the certain wavelength (i.e., wavelength of the respective channel).

The general principles of such fiber core configuration are known and do not for part of the invention. In a single-mode optical fiber, the zero-dispersion wavelength is the wavelength or wavelengths at which material dispersion and waveguide dispersion cancel one another. In multi-mode optical fiber, this refers to the minimal-dispersion wavelength, i.e. the wavelength at which the material dispersion is minimum, i.e. essentially zero.

Some examples of the construction and operation of such zero dispersion PCF are described in the following articles: Kokou Firmin Fiaboe et al., "*Photonic crystal fibers with flattened zero dispersion for supercontinuum generation*", Advanced Electromagnetics, Vol. 8, NO. 4, September 2019; Pranaw Kumar et al., "*Design of nonlinear photonic crystal fibers with ultra flattened zero dispersion for super continuum generation*", ETRI Journal Wiley, August 2019; Partha Sona Maji, Partha Roy, "*Supercontinuum generation in ultra flat near zero dispersion PCF with selective liquid infiltration*", Optik 125 (2014) 5986-5992.

Figure 2:
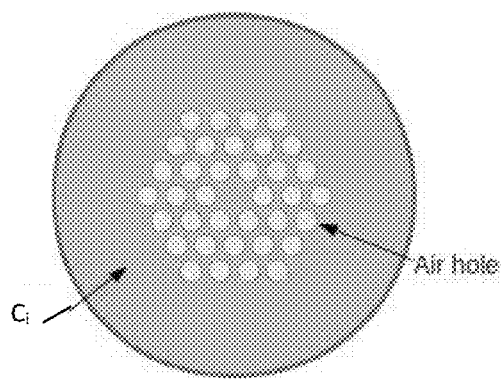
FIG. 2 exemplifies the general principles of configuring the individual fiber core to have a zero dispersion point for a certain central wavelength to thereby achieve spectral broadening around said central wavelength, according to some embodiments of the invention.

As shown schematically in FIG. 2, exemplifying a fiber core structure, the core material (semiconductor) is patterned to form a predetermined arrangement of spaced-apart air holes which may be filled by another suitable material. This may for example be optically active gas or highly nonlinear liquid. Suitable materials include those exhibiting high Kerr or photorefractive effect, e.g. liquid crystals or quantum dot solutions.

Such photonic crystal fibers have chromatic dispersion characteristics allowing a strong nonlinear interaction over a significant length of the fiber. This enables to provide the fiber with tailored chromatic dispersion properties while maintaining nonlinearity. This is because high chromatic dispersion promotes supercontinuum generation if the pump wavelength falls at an unstable dispersion equilibrium.

Hence, for the purpose of the present invention, the features of the pattern (holes and spaces dimensions) and refractive indices of the materials are selected to define the zero dispersion point for a certain wavelength. These parameters include, for example, the hole periodicity, diameter and fill factor.

According to the invention, the entire arrangement of N so-patterned PCFs (cores $C_1, \ldots C_n$) define N different zero-dispersion points for central wavelengths $\lambda_1, \ldots, \lambda_n$ according to the N WDM channels of an ITU grid that is to be mixed. By this, the wavelengths of the broadened spectra of different channels can linearly interact with one another via non-linear effect.

Demultiplexing of the channels can be implemented by using an arrayed waveguide grating (AWG) at the output of the super continuum multi-core fiber unit 12.

Figure 3:
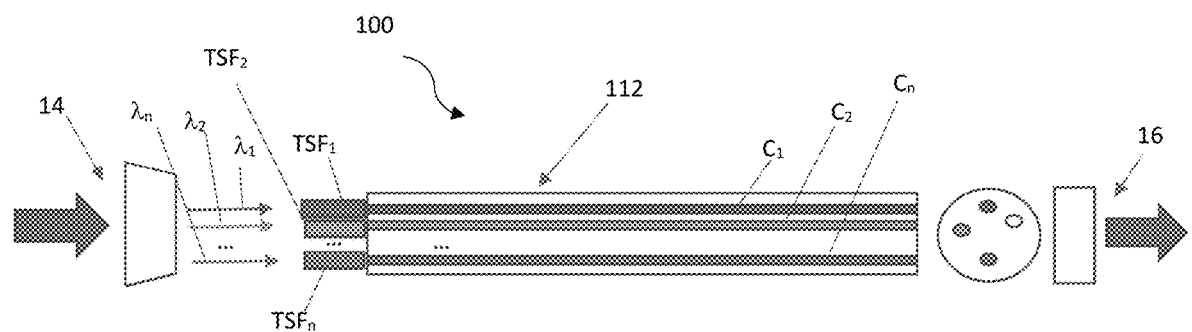
FIG. 3 schematically exemplifies a multi-dimensional WDM system utilizing a multicore fiber unit configured as a multiplexer, according to some other embodiments of the invention.

Reference is now made to FIG. 3 which schematically exemplifies a functional device of a WDM system 100 utilizing at least one multicore fiber unit 112 configured as a multi-dimensional multiplexing processor, according to some other embodiments of the invention. Similarly, to the above-described system 10, the multicore fiber unit 112 (which in this non-limiting example is also shown as a single multi-core fiber) extends between input and output ports 14 and 16. Here, the multi-core fiber 12, including N cores $C_1, \ldots C_n$, supporting N different wavelengths $\lambda_1, \ldots, \lambda_n$, is associated with (equipped with) a tunable spectral unit formed by respective N tunable spectral filters $TSF_1, \ldots TSF_n$, associated with the N cores. Each i-th tunable spectral filter $TSF_1$ is configured to encode the respective wavelength channel by applying thereto a different weight.

Figure 4:
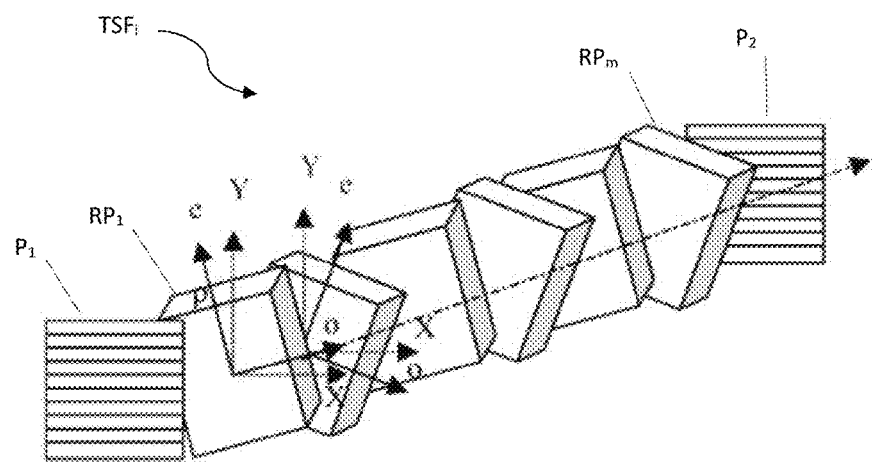
FIG. 4 exemplifies a tunable spectral filter suitable to be used in the system of FIG. 3 in association with a wavelength channel (fiber core).

The tunable spectral filter may be configured based on a Solc filter, for example as described in the article G. Shabtay, E. Eidinger, Z. Zalevsky, D. Mendlovic and E. Marom, "*Tunable birefringent filters—optimal iterative design*" Opt. Express 10 1534-1541 (2002). The spectral filtering is based on birefringent effects utilizing phase shifts between orthogonal polarizations of light to obtain a narrow band filter. An example of such filter $TSF_1$ is shown in FIG. 4. The filter includes a sequence of M tilted retardation plates $RP_1, \ldots RP_m$, enclosed between polarizers $P_1$ and $P_2$.

Such N tunable spectral filters $TSF_1, \ldots TSF_n$ apply N different weight functions $WF_1, \ldots WF_n$, for side lobes attenuation of the N channels $\lambda_1, \ldots, \lambda_n$. As a result, all the spectral information of the N channels is added together resulting in weighted mixing of the channels.

The invention claimed is:

1. A wavelength multiplexing system comprising at least one basic functional unit extending between input and output light ports, the basic functional unit comprising at least one multi-core fiber, the multi-core fiber comprising N cores configured for supporting transmission of N wavelength channels $\lambda_1, \ldots, \lambda_n$, wherein each of said at least one multi-core fibers is configured to apply a predetermined encoding pattern to the N wavelength channels propagating through the N cores enabling linear mixing between said N wavelength channels while propagating through the cores of said multi-core fiber, wherein said N cores of the multi-core fiber are configured as supercontinuum generators defining N zero-dispersion points for N wavelengths $\lambda_1, \ldots, \lambda_n$, respectively, said predetermined encoding pattern being a dispersion pattern applying spectral broadening of the N channels around said N wavelengths.

2. The wavelength multiplexing system according to claim 1, wherein said N cores of the multi-core fiber are configured as photonic crystal fibers (PCFs).

3. An optical fiber unit configured and operable for use in the wavelength multiplexing system according to claim 1.

4. The wavelength multiplexing system according to claim 1, wherein the basic functional unit comprises a number M (M≥1) of the multi-core fibers.

5. The wavelength multiplexing system according to claim 4, wherein the basic functional unit comprises the multi-core fibers identical in at least one of a number of fibers and a number of cores.

6. The wavelength multiplexing system according to claim 4, wherein the basic functional unit comprises the multi-core fibers different in at least one of a number of fibers and in a number of cores.

7. The wavelength multiplexing system according to claim 1, wherein said multi-core fiber comprises a plurality of the N cores supporting the N different wavelengths $\lambda_1, \ldots, \lambda_n$, and is configured and operable as a multi-dimensional wavelength multiplexing processor for processing the respective N input data channels of the wavelengths $\lambda_1, \ldots, \lambda_n$, by encoding light input signals via a non-linear effect, to enable linear interaction and mixing between the channels.

8. The wavelength multiplexing system according to claim 1, wherein a core material of the N cores is patterned to form a predetermined arrangement of spaced-apart holes.

9. The wavelength multiplexing system according to claim 8, wherein said holes are filled by an optically active gas or a highly nonlinear liquid exhibiting high Kerr or photorefractive effect.

10. The wavelength multiplexing system according to claim 9, wherein said holes are filled by liquid crystals or quantum dot solutions.

11. The wavelength multiplexing system according to claim 9, wherein features of the pattern are selected to define the zero dispersion point for the respective wavelength.

12. The wavelength multiplexing system according to claim 11, wherein said features comprise one or more of a hole arrangement periodicity, hole diameter, and fill factor.

13. The wavelength multiplexing system according to claim 11, wherein refractive indices of the core material and of said optically active gas or highly nonlinear liquid are selected to define the zero dispersion point for the respective wavelength.

14. A wavelength multiplexing system comprising at least one basic functional unit extending between input and output light ports, the basic functional unit comprising at least one multi-core fiber, the multi-core fiber comprising N cores configured for supporting transmission of N wavelength channels $\lambda_1, \ldots, \lambda_n$, wherein each of said at least one multi-core fibers is configured to apply a predetermined encoding pattern to the wavelength channels enabling linear mixing between them while propagating through multiple cores of said multi-core fiber, wherein said predetermined encoding pattern is defined by tunable spectral filtering of the wavelength channels $\lambda_1, \ldots, \lambda_n$ applying a different weight function to the respective one of the wavelength channels to enabling linear weighted mixing of the channels.

15. The wavelength multiplexing system according to claim 14, comprising a tunable spectral filter device comprising N tunable spectral filters associated with the N wavelength channels, each of said N tunable spectral filters being configured and operable as a birefringent filter applying the different weight function to the respective one of the wavelength channels.

16. An optical fiber unit configured and operable for use in the wavelength multiplexing system according to claim 6.

17. The wavelength multiplexing system according to claim 14, wherein the basic functional unit comprises a number M (M≥1) of the multi-core fibers.

18. The wavelength multiplexing system according to claim 17, wherein the basic functional unit comprises the multi-core fibers identical in at least one of a number of fibers and a number of cores.

19. The wavelength multiplexing system according to claim 17, wherein the basic functional unit comprises the multi-core fibers different in at least one of a number of fibers and a number of cores.

* * * * *